United States Patent Office 2,920,080
Patented Jan. 5, 1960

2,920,080
PROCESS OF PREPARING TRYPTAMINE COMPOUNDS

Robert Bucourt, Villiers-le-Bel, Jacques Valls, Paris, and Robert Joly, Montmorency, France, assignors to Les Laboratoires Francais de Chimiotherapie, Paris, France, a corporation of France No Drawing. Application November 24, 1958
Serial No. 775,732

Claims priority, application France November 29, 1957

5 Claims. (Cl. 260—319)

The present invention relates to an improved process of producing tryptamine compounds.

It is one object of the present invention to provide a simple and effective improved process of producing tryptamine compounds which are useful as intermediates in the synthesis of physiologically active compounds of the reserpine series.

Other objects of the present invention and advantageous features thereof will become apparent as the description proceeds.

In principle, the present invention relates to a process of producing tryptamine compounds of the general formula

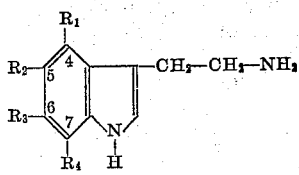

wherein $R_1$, $R_2$, $R_3$, and $R_4$ represent hydrogen, halogen, an alkoxy group, a benzyloxy group, or an alkyl radical.

The process according to the present invention may be illustrated by the following reaction equations:

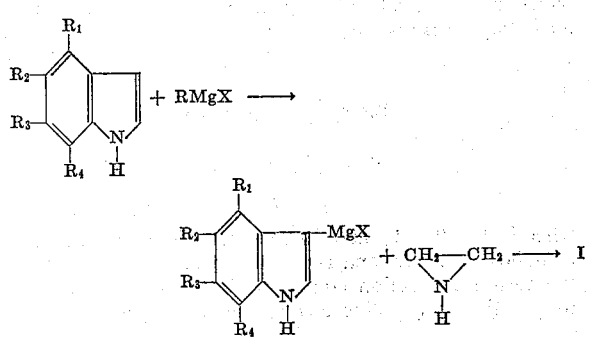

As is evident therefrom, the improved process consists in converting an indole compound having the same substituents as the desired tryptamine compound into the corresponding indolyl magnesium halogenide by reaction with an alkyl magnesium halogenide and reacting said indolyl magnesium halogenide with ethylene imine. The desired tryptamine compounds which, as stated above, are useful as intermediates in the synthesis of the corresponding deserpidine compounds are readily obtained thereby.

The indole compounds used as starting materials are prepared according to processes known from the literature or by modified processes as they are generally used for the preparation of analogous compounds.

The indolyl magnesium halogenide compounds are obtained by reacting an alkyl magnesium halogenide with the indole compound used as starting material in an inert solvent such as ether, tetrahydrofuran, the dimethyl ether of glycol, anisole, or the like. For economical reasons methyl magnesium bromide or chloride are the preferred alkyl magnesium halogenides. It is sufficient to add to the indolyl magnesium halogenide ethylene imine which may be diluted, if necessary, with a solvent identical to that wherein the alkyl magnesium halogenide is prepared, or with another solvent of a higher boiling point which permits operation at a higher reaction temperature. After the reaction is completed, water is added in order to decompose the magnesium halogenide compound and the resulting tryptamine compound is converted into a salt which is insoluble in an acid medium, preferably into the picrate, which is insoluble in an acetic acid medium, or into the hydrochloride which is insoluble in a hydrochloric acid medium. By alkalizing the salt, the tryptamine base is set free and is generally obtained in a pure state. It may readily be further purified by converting the crude tryptamine compound into the N-tryptamino carboxylate of the correspondingly substituted tryptamine by the action of gaseous carbon dioxide upon an alcoholic solution of said tryptamine compound, decomposing the resulting carboxylate compound, and, thereby, regenerating the desired tryptamine compound by the action of heat.

The following tryptamine compounds have been prepared in this manner by following the procedure described in the example given hereinafter and replacing indole by the corresponding substituted indole.

| Resulting tryptamine compound | Starting indole | Melting point, °C. |
|---|---|---|
| Tryptamine | indole | 120 |
| 5-Chloro tryptamine as hydrochloride | 5-chloro indole | 297 |
| 6-Chloro tryptamine | 6-chloro indole | 113 |
| 7-Chloro tryptamine | 7-chloro indole | 96 |
| 5,6-Dimethoxy tryptamine | 5,6-dimethoxy indole | 90 |
| 6-Methyl tryptamine | 6-methyl indole | 141 |
| 5-Methoxy tryptamine | 5-methoxy indole | 120 |
| 6-Methoxy tryptamine | 6-methoxy indole | 144 |
| 5-Benzyloxy tryptamine as hydrochloride | 5-benzyloxy indole | 265 |

The following example serves to illustrate the present invention without, however, limiting the same thereto. More particularly, the nature of the indole compound used as starting material and of the alkyl magnesium halogenide employed as the one reactant as well as the nature of the solvent may be varied by those skilled in the art in accordance with the principles set forth herein and in the claims annexed hereto.

The melting points given in the example are instantaneous melting points determined on the Maquenne block.

Example

PREPARATION OF TRYPTAMINE
(FORMULA I, WHEREIN $R_1$, $R_2$, $R_3$, AND $R_4$=H)

15.35 g. of indole are dissolved in 40 cc. of anhydrous ether. The solution is added to 50 cc. of a solution of methyl magnesium bromide in ether containing 2.62 g.-moles of said magnesium compound per l., while stirring in a nitrogen atmosphere. The mixture is refluxed for 15 minutes. After cooling in an ice bath, 6.8 cc. of ethylene imine diluted with 30 cc. of anhydrous xylene are added. The mixture is stirred at 20° C. for 1½ hours and the ether is distilled off whereby xylene is added in such a manner, that the volume of the solution in the reaction vessel remains the same. As soon as only xylene passes over and all the ether is distilled off, the fractionating column is replaced by a reflux condenser and the mixture is boiled for 1 hour. After cooling to 20° C., 75 cc. of water are added drop by drop thereto with cooling and hydrochloric acid is added to yield a pH-value of 1.0. The resulting tryptamine hydrochloride which is insoluble in this mixture is filtered off with suction, washed with ether, and dissolved in 150 cc. of boiling water. The solution is cooled to 10° C. for about 15 minutes. Decolorizing carbon is added and the mixture is filtered to remove the carbon together with an insoluble gum-like by-product. The resulting filtered solution of the tryptamine compound is mixed slowly and with mechanical stirring with 80 cc. of a 10 N sodium hydroxide solution and stirring is continued for some time while the mixture is cooled to about +5° C. The precipitated tryptamine is filtered with suction and washed with as little iced-water as possible until no more chloride ions are detected in the wash water. After removing adhering water by suction and drying, 9.64 g. of pure tryptamine, melting at 116° C., are obtained.

By adjusting the pH-value of the acid mother liquors of tryptamine hydrochloride to a pH of 10.0 by the addition of ammonia and extracting the solution with methylene chloride, a second crop of tryptamine is obtained.

Of course, other indole compounds which may be substituted in their phenyl ring by one or more chlorine, bromine, or iodine atoms, by lower alkoxy groups, by benzyloxy groups, or by lower alkyl radicals than those mentioned hereinabove, may likewise be used as starting materials. Conversion of these tryptamine compounds into compounds of the reserpine series is carried out according to known processes, for instance, according to Woodward et al., J. Am. Chem. Soc., vol. 78, 2023–5.

We claim:

1. In a process of producing tryptamine compounds of the formula

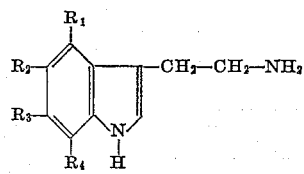

(I)

wherein $R_1$, $R_2$, $R_3$, and $R_4$ represent members selected from the group consisting of hydrogen, halogen, an alkyl radical, an alkoxy, and a benzyloxy group, the steps which comprise reacting an indole compound of the formula

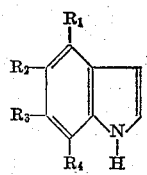

(II)

wherein $R_1$, $R_2$, $R_3$, and $R_4$ represent the same members as indicated above, with an alkyl magnesium halogenide in an inert solvent, subjecting the resulting indolyl magnesium halogenide to the action of ethylene imine, decomposing the reaction product by means of water, and isolating the resulting tryptamine compound.

2. The process according to claim 1, wherein the alkyl magnesium halogenide is methyl magnesium bromide.

3. The process according to claim 1, wherein the inert solvent is a solvent selected from the group consisting of ether, an alkyl benzene, tetrahydrofuran, and the dimethyl ether of glycol.

4. In a process of producing tryptamine compounds of the formula

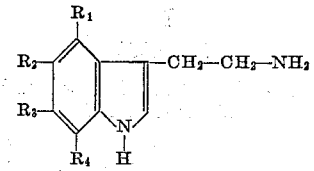

wherein $R_1$, $R_2$, $R_3$, and $R_4$ represent members selected from the group consisting of hydrogen, halogen, an alkyl radical, an alkoxy, and a benzyloxy group, the steps which comprise reacting an indole compound of the formula wherein $R_1$, $R_2$, $R_3$, and $R_4$ represent the same members as indicated hereinabove, with an alkyl magnesium halogenide in an inert solvent, subjecting the resulting indolyl magnesium halogenide to the action of ethylene imine, decomposing the reaction product by means of water, converting the resulting tryptamine compound by reaction with a salt-forming acid into its acid addition salt, separating said acid addition salt from the conversion mixture, alkalizing said salt to form the corresponding tryptamine base, and recrystallizing said base.

5. In a process of producing tryptamine compounds of the formula wherein $R_1$, $R_2$, $R_3$, and $R_4$ represent members selected from the group consisting of hydrogen, halogen, an alkyl radical, an alkoxy, and a benzyloxy group, the steps which comprise adding ethylene imine to a solution of an indolyl magnesium halogenide of the formula wherein $R_1$, $R_2$, $R_3$, and $R_4$ represent the same members as indicated above, and Hal is halogen, and decomposing the resulting reaction compound by means of water to form the corresponding tryptamine compound.

References Cited in the file of this patent

UNITED STATES PATENTS

| | | |
|---|---|---|
| 2,414,715 | Britton et al. | Jan. 21, 1947 |
| 2,698,345 | Speeter | Dec. 28, 1954 |
| 2,703,325 | Speeter | Mar. 1, 1955 |
| 2,873,297 | Ramsden | Feb. 10, 1959 |
| 2,883,394 | Schindler | Apr. 21, 1959 |

OTHER REFERENCES

Tarbell et al.: Jour. A. C. S., vol. 68, pp. 2499–2500 (1946).

Majima et al.: Berichte, vol. 58B, pp. 2042–2046 (1925).